(12) United States Patent
Sung

(10) Patent No.: US 8,852,470 B2
(45) Date of Patent: *Oct. 7, 2014

(54) DIFFUSER-INTEGRATED PRISM SHEET FOR BACKLIGHT UNITS AND METHOD OF MANUFACTURING THE SAME

(75) Inventor: Gi Suk Sung, Seongnam-si (KR)

(73) Assignee: On-Nuri Electronics Inc., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 13/551,717

(22) Filed: Jul. 18, 2012

(65) Prior Publication Data
US 2012/0281290 A1 Nov. 8, 2012

Related U.S. Application Data

(62) Division of application No. 12/522,886, filed on Jul. 10, 2009.

(30) Foreign Application Priority Data

Feb. 1, 2007 (KR) .................. 10-2007-0010774

(51) Int. Cl.
*B29D 11/00* (2006.01)
(52) U.S. Cl.
USPC ........ 264/1.38; 156/209; 156/272.2; 264/1.6; 264/1.7

(58) Field of Classification Search
USPC .................. 264/1.1, 1.7, 1.36, 1.38, 1.6, 2.7; 156/60, 219, 196, 199, 209, 272.2
See application file for complete search history.

(56) References Cited

U.S. PATENT DOCUMENTS

| | | | | | |
|---|---|---|---|---|---|
| 5,831,766 | A | * | 11/1998 | Martin et al. | 359/529 |
| 6,846,089 | B2 | * | 1/2005 | Stevenson et al. | 362/627 |
| 7,875,218 | B2 | * | 1/2011 | Parker et al. | 264/1.7 |
| 2006/0279679 | A1 | * | 12/2006 | Fujisawa et al. | 349/116 |
| 2008/0223510 | A1 | * | 9/2008 | Mizuno et al. | 156/209 |
| 2009/0213464 | A1 | * | 8/2009 | Kurachi et al. | 359/599 |

* cited by examiner

*Primary Examiner* — Mathieu D. Vargot
(74) *Attorney, Agent, or Firm* — LRK Patent Law Firm

(57) ABSTRACT

A diffuser-integrated prism sheet is provided, in which diffuser layers are provided on the upper and lower surfaces of the prism sheet and prism-shaped protrusions are formed in the prism sheet. The prism sheet for backlight units includes a lower diffuser layer having a light diffusion structure, a lower layer formed on the lower diffuser layer, a first intermediate layer formed on the lower layer and having prism-shaped protrusions formed parallel to each other, a second intermediate layer formed on the first intermediate layer, an upper layer formed on the second intermediate layer, and an upper diffuser layer formed on the upper layer and having a light diffusion structure, wherein an air layer is formed between the lower surface of the second intermediate layer and the valleys of the prism-shaped protrusions of the first intermediate layer. Also, a method of manufacturing the diffuser-integrated prism sheet is provided.

4 Claims, 9 Drawing Sheets

DIFFUSER-INTEGRATED PRISM SHEET FOR BACKLIGHT UNITS AND METHOD OF MANUFACTURING THE SAME

CROSS REFERENCE TO RELATED APPLICATION

This application is a division of U.S. patent application Ser. No. 12/522,886, filed on Jul. 10, 2009, the disclosure of which is incorporated by reference in its entirety for all purposes.

BACKGROUND

1. Field

The present invention relates to a diffuser-integrated prism sheet for backlight units and a method of manufacturing the same. More particularly, the present invention relates to a prism sheet for backlight units, in which diffuser layers are provided on upper and lower surfaces of the prism sheet and prism-shaped protrusions are formed in the prism sheet, and to a method of manufacturing the same.

2. Description of the Related Art

FIG. 1 illustrates the construction of a conventional backlight unit.

As illustrated in FIG. 1, in the conventional backlight unit, a fluorescent lamp 1, which is a linear light source, and a lamp reflector plate 2 for reflecting the light of the fluorescent lamp 1 are disposed to one side of a light guide plate 3 for using the light from the fluorescent lamp 1 as a surface light source, and a reflector sheet 4 for preventing the leakage of light is disposed under the light guide plate 3. Further, a diffuser sheet 5 for uniformly diffusing light is placed on the light guide plate 3, and prism sheets 6, 7 respectively having a plurality of triangular linear prisms 8, 9 to collect scattered light are sequentially placed on the diffuser sheet 5. Two prism sheets 6, 7 are disposed so that linear prisms 8, 9 are perpendicular to each other, thus collecting light radiated in different directions. On the upper prism sheet 9, a protector sheet 10 for protecting the prisms from being scratched and preventing the entry of impurities between the prisms is disposed. The individual constituents are assembled, thereby completing a backlight unit.

However, because the conventional prism sheet has the prism-shaped protrusions on one surface thereof, defects caused by scratching of the prism-shaped protrusions and by the entry of small impurities into the valleys between the prism-shaped protrusions and shatter cracks caused by cutting of the prism-shaped protrusions, attributable to friction with the protective sheet, may be generated when the backlight unit is assembled. Hence, even if the backlight unit is carefully assembled, many assembly defects may occur, undesirably decreasing productivity, and furthermore, in the case where defects occur, the manufacturing process must be conducted again, resulting in high material cost loss.

Further, problems occur because the diffuser sheet, the prism sheet, and the protector sheet must be sequentially and separately layered in the assembly process.

SUMMARY

Accordingly, the present invention has been made keeping in mind the above problems occurring in the related art, and provides a diffuser-integrated prism sheet, in which various optical sheets are integratedly layered, and thus diffuser layers are formed on the outer surfaces of the prism sheet, and prism-shaped protrusions are formed in the prism sheet, in order to prevent the prism-shaped protrusions from being scratched, prevent the entry of impurities into the valleys between the prism-shaped protrusions in the course of assembling a backlight unit, and realize a short assembly time and a simple assembly process, resulting in decreased costs, and also provides a method of manufacturing the same.

According to the present invention, a diffuser-integrated prism sheet for backlight units may comprise a lower diffuser layer having a light diffusion structure, a lower layer formed on the upper surface of the lower diffuser layer, a first intermediate layer formed on the upper surface of the lower layer and having a plurality of prism-shaped protrusions formed parallel to each other, a second intermediate layer formed on the upper surface of the first intermediate layer, an upper layer formed on the upper surface of the second intermediate layer, and an upper diffuser layer formed on the upper surface of the upper layer and having a light diffusion structure, wherein an air layer is formed between the lower surface of the second intermediate layer and the valleys of the prism-shaped protrusions of the first intermediate layer.

DETAILED DESCRIPTION

Hereinafter, a detailed description will be given of the preferred embodiments of the present invention with reference to the appended drawings.

Figure 1:
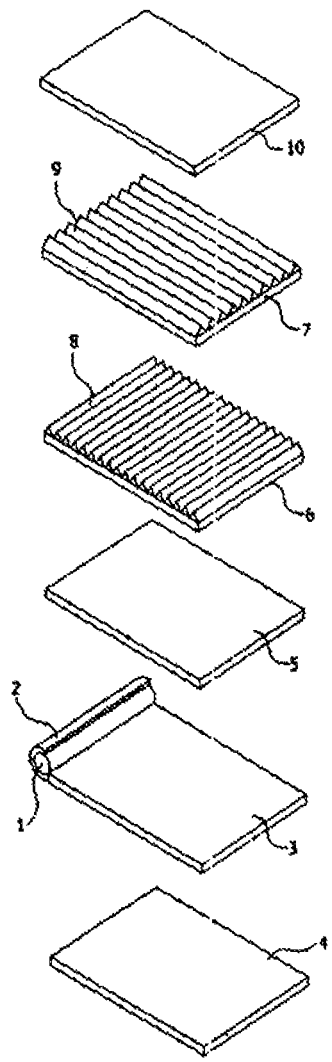
FIG. 1 is an exploded perspective view illustrating a conventional backlight unit.
Figure 2:
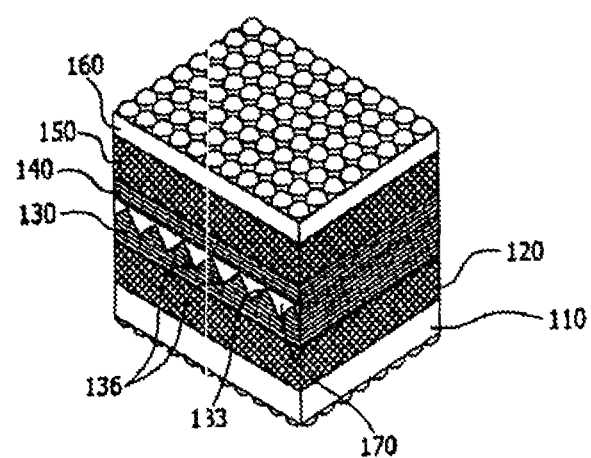
FIG. 2 is a perspective view illustrating a diffuser-integrated prism sheet according to a first embodiment of the present inventor.

FIG. 2 is a perspective view illustrating a diffuser-integrated prism sheet according to a first embodiment of the present invention.

As illustrated in FIG. 2, the diffuser-integrated prism sheet according to the first embodiment of the present invention comprises a lower diffuser layer 110, a lower layer 120, a first intermediate layer 130, a second intermediate layer 140, an upper layer 150, an upper diffuser layer 160, and an air layer 170.

The lower diffuser layer 110 and the upper diffuser layer 160 have structures for uniformly diffusing light. Specifically, the lower diffuser layer 110 has a plurality of hemispherical protrusions for diffusing light on the lower surface thereof, and the upper diffuser layer 160 has a plurality of hemispherical protrusions for diffusing light on the upper surface thereof.

The height of the protrusions formed on the lower diffuser layer 110 and the upper diffuser layer 160 ranges from 1 μm to 150 μm.

Figure 3:
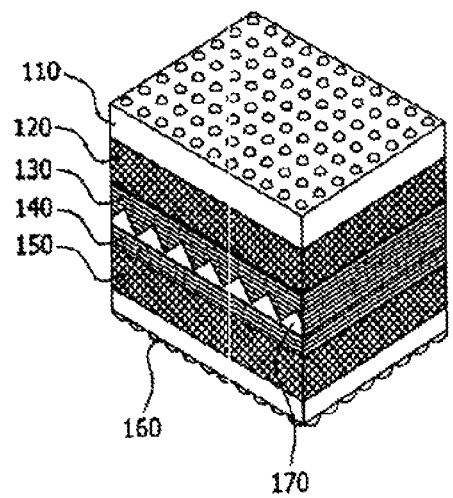
FIG. 3 is a bottom perspective view illustrating the diffuser-integrated prism sheet of FIG. 2, in which the size and density of the protrusions of the lower diffuser layer are suppressed.

As illustrated in FIG. 3, when the density of the protrusions formed on the lower diffuser layer 110 is suppressed while the height thereof is maintained to the range from 1 μm to 50 μm, spaces are defined between the protrusions, thereby realizing a non-slip function rather than a diffusion function.

The lower layer 120 and the upper layer 150 are formed of synthetic resin, such as PET (polyethylene terephthalate).

The lower diffuser layer 110, the first intermediate layer 130, the second intermediate layer 140, and the upper diffuser layer 160 are formed of a UV light-curable acrylic resin or a heat-curable acrylic resin.

In the first intermediate layer 130, a plurality of prism-shaped protrusions, cross-sections of which have a triangular shape or a polygonal shape having five or more sides, similar to the triangular shape, is formed parallel to each other, in order to collect light in a direction perpendicular to the upper and lower surfaces of the diffuser-integrated prism sheet.

The ridges 133 of the prism-shaped protrusions of the first intermediate layer 130 are integrated with the lower surface of the second intermediate layer 140 through fusion. Further, an air layer 170 is formed between the lower surface of the second intermediate layer 140 and the valleys 136 of the prism-shaped protrusions.

The reason why the air layer 170 is formed is as follows. That is, because the refractive index of air is 1 and the refractive index of material other than air is greater than 1, in the case where the above space is filled with material other than air, the effect of collecting light in the direction perpendicular to the upper and lower surfaces of the diffuser-integrated prism sheet is decreased, as per Snell's law. Thus, the intention is to maximize the light collection effect.

Light emitted from the light guide plate is diffused, collected, and then diffused again, through the prism sheet, which is integratedly layered with the diffuser sheet to thus exhibit a diffusion function, thereby realizing desired luminance and viewing angle of a backlight unit. This case eliminates the problems with general prism sheets, in which scratches occur upon the use thereof and a process of assembling a plurality of optical sheets is complicated, ultimately improving the workability of assembly of sheets and productivity, resulting in decreased costs.

Figure 4:
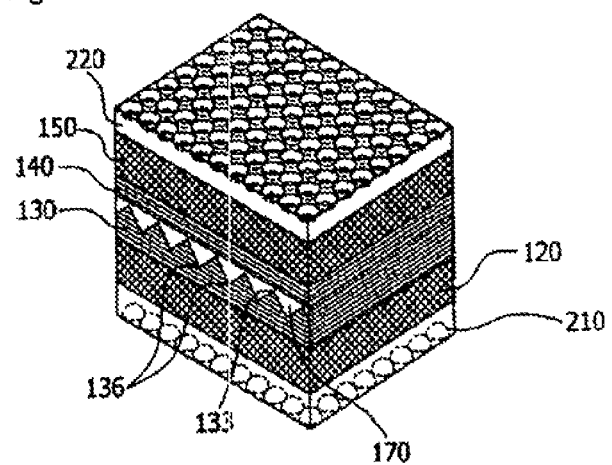
FIG. 4 is a perspective view illustrating a diffuser-integrated prism sheet according to a second embodiment of the present invention.

FIG. 4 is a perspective view illustrating a diffuser-integrated prism sheet according to a second embodiment of the present invention.

As illustrated in FIG. 4, the diffuser-integrated prism sheet according to the second embodiment of the present invention comprises a lower diffuser layer 210, a lower layer 120, a first intermediate layer 130, a second intermediate layer 140, an upper layer 150, an upper diffuser layer 220, and an air layer 170.

The lower diffuser layer 210 and the upper diffuser layer 220 have structures for uniformly diffusing light. Specifically, the lower diffuser layer 210 has a plurality of hemispherical recesses for diffusing light in the lower surface thereof, and the upper diffuser layer 220 has a plurality of hemispherical recesses for diffusing light in the upper surface thereof.

The depth of the recesses formed in the lower diffuser layer 210 and the upper diffuser layer 220 ranges from 1 μm to 150 μm.

As in the lower diffuser layer 110 shown in FIG. 3, when the density of the recesses formed in the lower diffuser layer 210 is suppressed while the depth thereof is maintained to the range from 1 μm to 50 μm, spaces are defined between the recesses, thereby realizing a non-slip function rather than a diffusion function.

The lower layer 120, the first intermediate layer 130, the second intermediate layer 140, the upper layer 150, and the air layer 170 are formed as in the diffuser-integrated prism sheet according to the first embodiment of the present invention, and a detailed description thereof is thus omitted.

Figure 5:
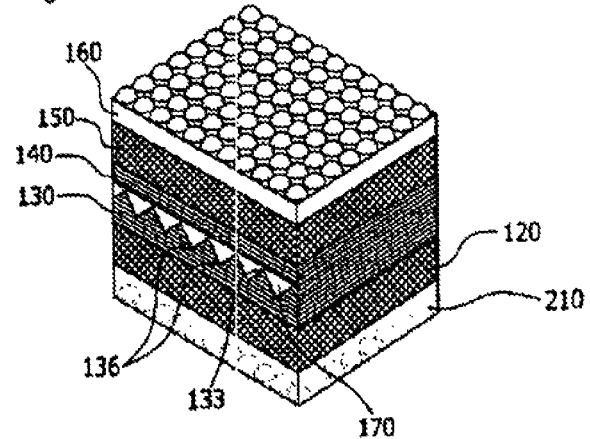
FIG. 5 is a perspective view illustrating a diffuser-integrated prism sheet according to a third embodiment of the present invention.
Figure 6:
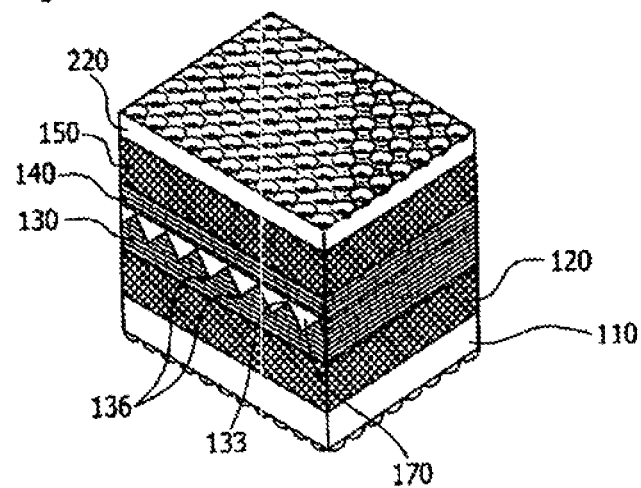
FIG. 6 is a perspective view illustrating a diffuser-integrated prism sheet according to a fourth embodiment of the present invention.

In addition, the diffuser-integrated prism sheet according to the present invention may be manufactured in a manner such that the lower diffuser layer 210 and the upper diffuser layer 160 are provided as illustrated in FIG. 5 ($3^{rd}$ embodiment), or such that the lower diffuser layer 110 and the upper diffuser layer 220 are provided as illustrated in FIG. 6 ($4^{th}$ embodiment).

Figure 7:
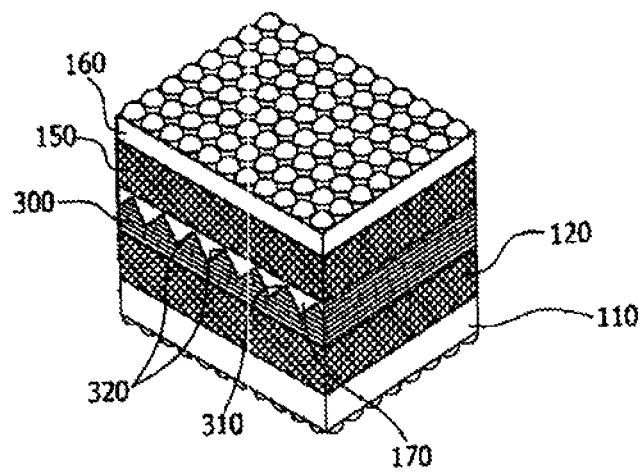
FIG. 7 is a perspective view illustrating a diffuser-integrated prism sheet according to a fifth embodiment of the present invention.

FIG. 7 is a perspective view illustrating a diffuser-integrated prism sheet according to a fifth embodiment of the present invention.

As illustrated in FIG. 7, the diffuser-integrated prism sheet according to the fifth embodiment of the present invention comprises a lower diffuser layer 110, a lower layer 120, an intermediate layer 300, an upper layer 150, an upper diffuser layer 160, and an air layer 170.

A small amount of adhesive 320 is applied on the ridges 310 of the prism-shaped protrusions of the intermediate layer 300, and the ridges 310 of the prism-shaped protrusions are integrated with the lower surface of the upper layer 150 through adhesion using the adhesive. Useful adhesives include, for example, highly transparent polymers, such as silicone-urethane (SU) hybrid polymers, acrylic polymers, and polyester-based polymers. In the case where too much adhesive is used, the functionality of the prism is weakened, and stain defects may occur. Preferably, the adhesive is used in as small an amount as possible while still maintaining adhesion.

The lower diffuser layer 110, the lower layer 120, the upper layer 150, the upper diffuser layer 160, and the air layer 170 are formed as in the diffuser-integrated prism sheet according to the first embodiment of the present invention, and thus a detailed description thereof is omitted.

Figure 8:
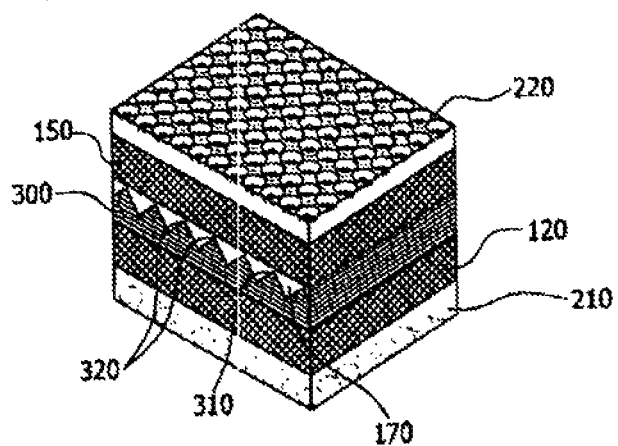
FIG. 8 is a perspective view illustrating a diffuser-integrated prism sheet according to a sixth embodiment of the present invention.
Figure 9:
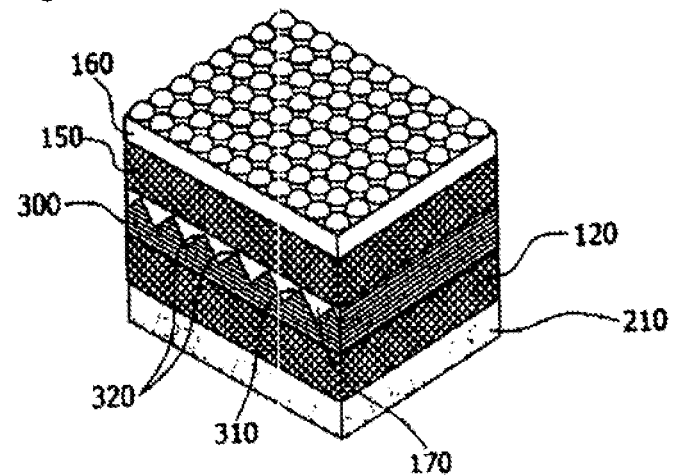
FIG. 9 is a perspective view illustrating a diffuser-integrated prism sheet according to a seventh embodiment of the present invention.
Figure 10:
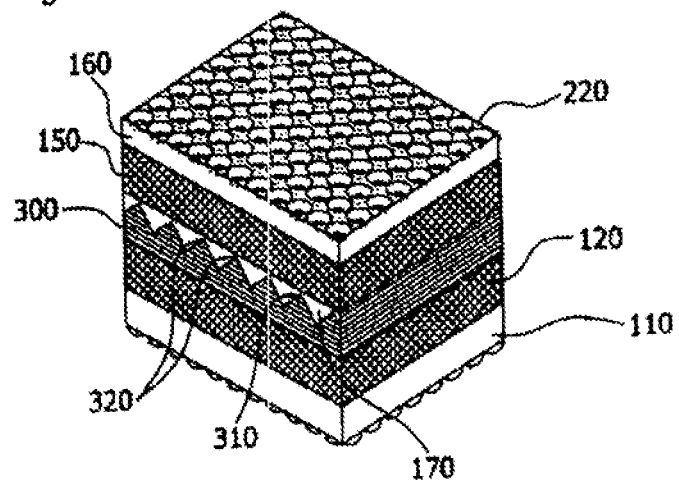
FIG. 10 is a perspective view illustrating a diffuser-integrated prism sheet according to an eighth embodiment of the present invention.

The diffuser-integrated prism sheet according to the fifth embodiment of the present invention may be modified in a manner such that the lower diffuser layer 110 and the upper diffuser layer 160 are replaced with the lower diffuser layer 210 and the upper diffuser layer 220, as illustrated in FIG. 8 (6$^{th}$ embodiment), such that the lower diffuser layer 210 and the upper diffuser layer 160 are provided as illustrated in FIG. 9 (7$^{th}$ embodiment), or such that the lower diffuser layer 110 and the upper diffuser layer 220 are provided as illustrated in FIG. 10 (8$^{th}$ embodiments).

Figure 11:
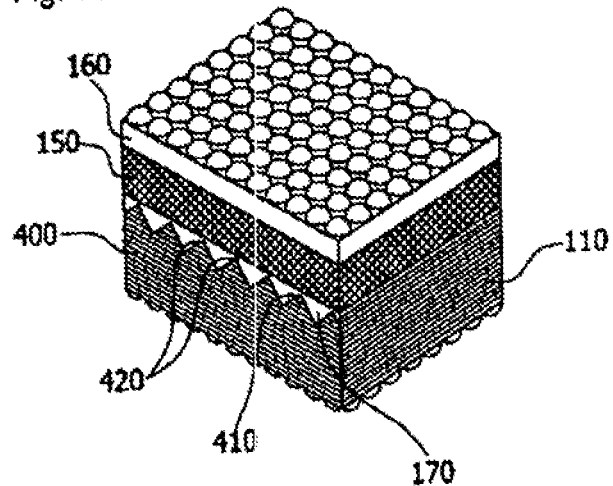
FIG. 11 is a perspective view illustrating a diffuser-integrated prism sheet according to a ninth embodiment of the present invention.

FIG. 11 is a perspective view illustrating a diffuser-integrated prism sheet according to a ninth embodiment of the present invention.

As illustrated in FIG. 11, the diffuser-integrated prism sheet according to the ninth embodiment of the present invention comprises a PC lower layer 400, an upper layer 150, an upper diffuser layer 160, and an air layer 170.

The PC lower layer 400 is formed of PC (polycarbonate). The upper surface of the PC lower layer 400 includes a plurality of prism-shaped protrusions formed parallel to each other, cross-sections of which have a triangular shape or a polygonal shape having five or more sides, similar to the triangular shape, in order to collect light in a direction perpendicular to the upper and lower surfaces of the flat prism sheet. The lower surface thereof includes a plurality of hemispherical protrusions for diffusing light.

The height of the protrusions formed on the PC lower layer 400 ranges from 1 μm to 150 μm.

As in the lower diffuser layer 110 shown in FIG. 3, when the density of the protrusions formed on the PC lower layer 400 is suppressed while the height thereof is maintained to the range from 1 μm to 50 μm, spaces are defined between the protrusions, thereby realizing a non-slip function rather than a diffusion function.

Further, a small amount of adhesive 420 is applied on the ridges 410 of the prism-shaped protrusions of the PC lower layer 400, and the ridges of the prism-shaped protrusions are integrated with the lower surface of the upper layer 150 through adhesion using the adhesive. Useful adhesives include, for example, highly transparent polymers, such as silicone-urethane (SU) hybrid polymers, acrylic polymers, and polyester-based polymers. In the case where too much adhesive is used, the functionality of the prism is weakened, and stain defects may occur. Preferably, the adhesive is used in as small an amount as possible while still maintaining adhesion.

The upper layer 150, the upper diffuser layer 160, and the air layer 170 are formed as in the diffuser-integrated prism sheet according to the first embodiment of the present invention, and thus a detailed description thereof is omitted.

Figure 12:
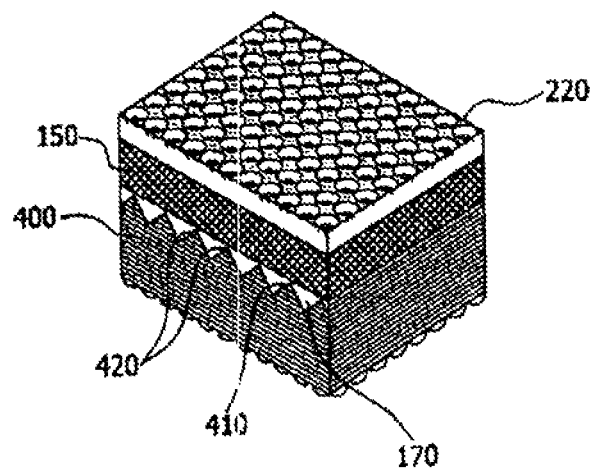
FIG. 12 is a perspective view illustrating a diffuser-integrated prism sheet according to a tenth embodiment of the present invention.

The diffuser-integrated prism sheet according to the ninth embodiment of the present invention may be modified in such a manner that the upper diffuser layer 160 is replaced with the upper diffuser layer 220, as illustrated in FIG. 12 (10$^{th}$ embodiment).

Figure 13:
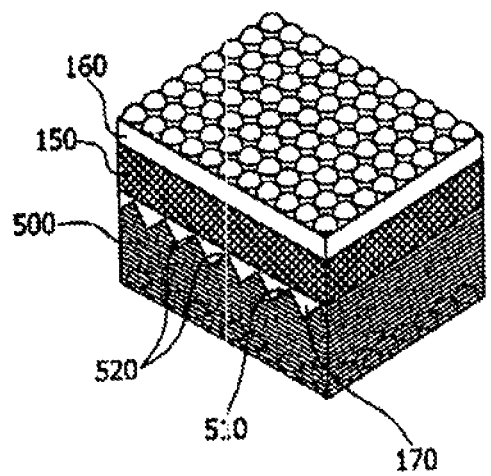
FIG. 13 is a perspective view illustrating a diffuser-integrated prism sheet according to an eleventh embodiment of the present invention.

FIG. 13 is a perspective view illustrating a diffuser-integrated prism sheet according to an eleventh embodiment of the present invention.

As illustrated in FIG. 13, the diffuser-integrated prism sheet according to the eleventh embodiment of the present invention comprises a PC lower layer 500, an upper layer 150, an upper diffuser layer 160, and an air layer 170.

The PC lower layer 500 is formed of PC (polycarbonate). The upper surface of the PC lower layer 500 includes a plurality of prism-shaped protrusions formed parallel to each other, cross-sections of which have a triangular shape or a polygonal shape having five or more sides, similar to the triangular shape, in order to collect light in a direction perpendicular to the upper and lower surfaces of the flat prism sheet. The lower surface thereof includes a plurality of hemispherical recesses for diffusing light.

The depth of the recesses formed in the PC lower layer 500 ranges from 1 μm to 150 μm.

A small amount of adhesive 520 is applied on the ridges 510 of the prism-shaped protrusions of the PC lower layer 500, and the ridges of the prism-shaped protrusions are integrated with the lower surface of the upper layer 150 through adhesion using the adhesive. Useful adhesives include, for example, highly transparent polymers, such as silicone-urethane (SU) hybrid polymers, acrylic polymers, and polyester-based polymers. In the case where too much adhesive is used, the functionality of the prism is weakened, and stain defects may occur. Preferably, the adhesive is used in as small an amount as possible while still maintaining adhesion.

The upper layer 150, the upper diffuser layer 160, and the air layer 170 are formed as in the diffuser-integrated prism sheet according to the first embodiment of the present invention, and a detailed description thereof is thus omitted.

Figure 14:
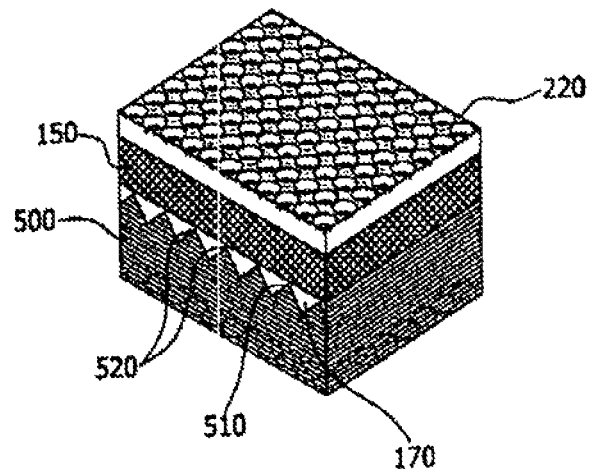
FIG. 14 is a perspective view illustrating a diffuser-integrated prism sheet according to a twelfth embodiment of the present invention.

The diffuser-integrated prism sheet according to the eleventh embodiment of the present invention may be modified in such a manner that the upper diffuser layer 160 is replaced with the upper diffuser layer 220, as illustrated in FIG. 14 (12$^{th}$ embodiment).

Figure 15:
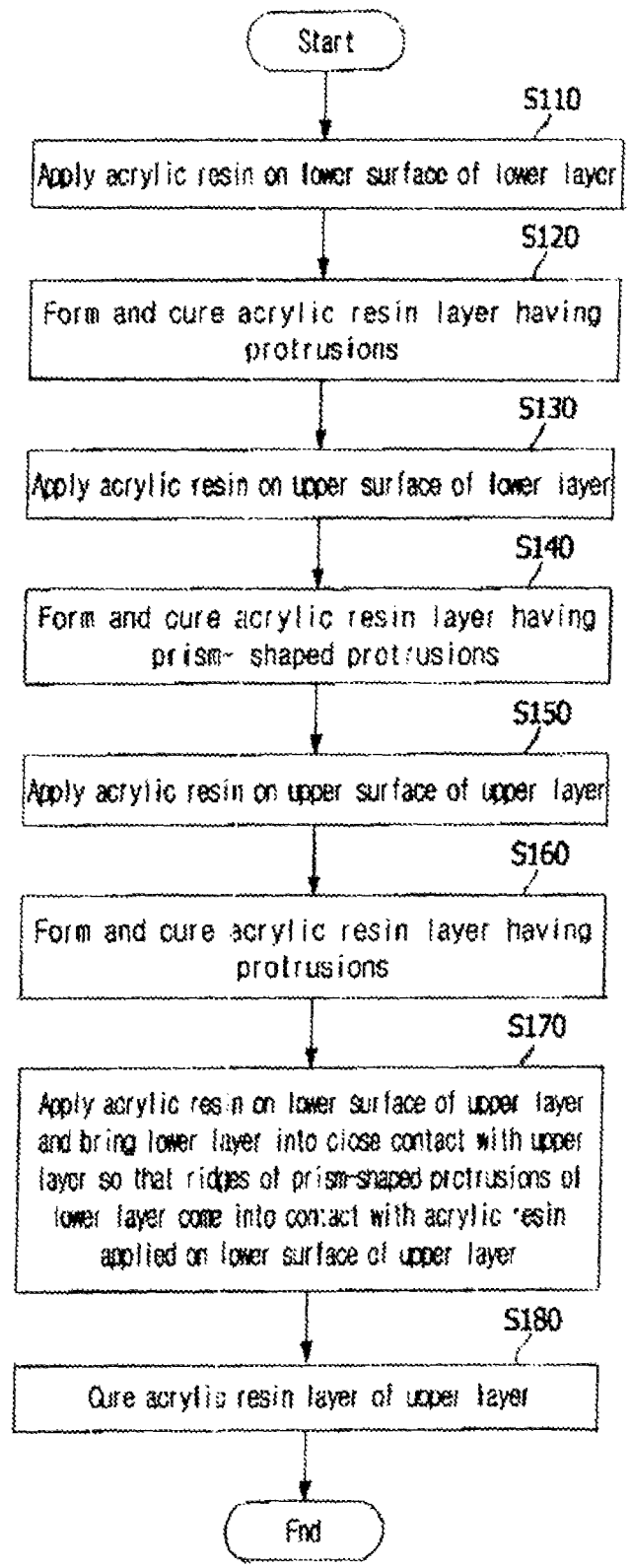
FIG. 15 is a flowchart illustrating a process of manufacturing the diffuser-integrated prism sheet according to the first embodiment of the present invention.

Turning to FIG. 15, there is a flowchart illustrating the process of manufacturing the diffuser-integrated prism sheet according to the first embodiment of the present invention.

The method of manufacturing the diffuser-integrated prism sheet according to the first embodiment comprises applying a UV light-curable acrylic resin or a heat-curable acrylic resin in an uncured state to a predetermined thickness on the lower surface of the lower layer 120 (S110); passing the lower layer 120 having the uncured acrylic resin applied on the lower surface thereof over a roll having a plurality of hemispherical recesses and in contact therewith to thus form an uncured acrylic resin layer having a plurality of hemispherical protrusions, and then radiating UV light or applying heat to thus completely cure the uncured acrylic resin layer having the plurality of hemispherical protrusions, thereby forming the lower diffuser layer 110 (S120); applying a UV light-curable acrylic resin or a heat-curable acrylic resin in an uncured state to a predetermined thickness on the upper surface of the lower layer 120 (S130); passing the lower layer 120 having the uncured acrylic resin applied on the upper surface thereof over a roll having prism-shaped recesses and in contact therewith to thus form an uncured acrylic resin layer having prism-shaped protrusions, and then radiating UV light or applying heat to thus completely cure the uncured acrylic resin layer having the prism-shaped protrusions, thereby forming the first intermediate layer 130 (S140); applying a UV light-curable acrylic resin or a heat-curable acrylic resin in an uncured state to a predetermined thickness on the upper surface of the upper layer 150 (S150); passing the upper layer 150 having the uncured acrylic resin applied on the upper surface thereof over a roll having a plurality of hemispherical recesses and in contact therewith to thus form an uncured acrylic resin layer having a plurality of hemispherical protrusions, and then radiating UV light or applying heat to thus completely cure the uncured acrylic resin layer having the plurality of hemispherical protrusions, thereby forming the upper diffuser layer 160 (S160); applying a UV light-curable acrylic resin or a heat-curable acrylic resin in an uncured state to a predetermined thickness on the lower surface of the upper layer 150 to thus form an uncured acrylic resin layer, and then bringing the lower layer 120 into close contact with the upper layer 150 so that the ridges of the prism-shaped protrusions of the first intermediate layer 130 come into contact with the uncured acrylic resin layer of the upper layer 150, under pressure the magnitude of which is set so that the ridges of the prism-shaped protrusions of the first intermediate layer 130 are not brought into direct contact with one surface of the upper layer 150 but slightly overlap with the uncured acrylic resin layer of the upper layer 150, in a state in which the lower layer 120 is positioned on the upper layer 150 such that the uncured acrylic resin applied on the upper layer 150 does not flow down along the prism-shaped protrusions of the first intermediate layer 130 (S170); and radiating UV light or applying heat to thus completely cure the uncured acrylic resin layer of the lower surface of the upper layer 150, thereby forming the second intermediate layer 140 (S180).

Figure 16:
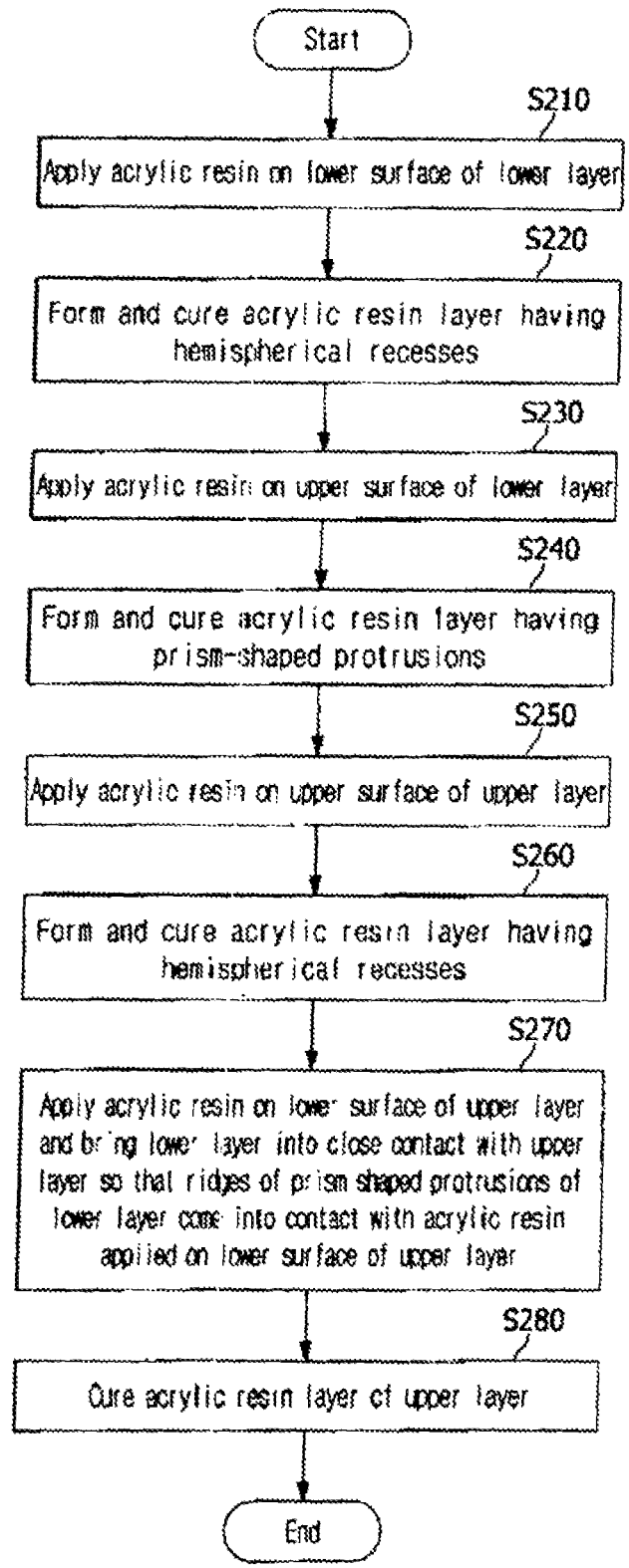
FIG. 16 is a flowchart illustrating a process of manufacturing the diffuser-integrated prism sheet according to the second embodiment of the present invention.

FIG. 16 is a flowchart illustrating a process of manufacturing the diffuser-integrated prism sheet according to the second embodiment of the present invention.

The method of manufacturing the diffuser-integrated prism sheet according to the second embodiment comprises applying a UV light-curable acrylic resin or a heat-curable acrylic resin in an uncured state to a predetermined thickness on the lower surface of the lower layer 120 (S210); passing the lower layer 120 having the uncured acrylic resin applied on the lower surface thereof over a roll having a plurality of hemispherical protrusions and in contact therewith to thus form an uncured acrylic resin layer having a plurality of hemispherical recesses, and then radiating UV light or applying heat to thus completely cure the uncured acrylic resin layer having the plurality of hemispherical recesses, thereby forming the lower diffuser layer 210 (S220); applying a UV light-curable acrylic resin or a heat-curable acrylic resin in an uncured state to a predetermined thickness on the upper surface of the lower layer 120 (S230), passing the lower layer 120 having the uncured acrylic resin applied on the upper surface thereof over a roll having prism-shaped recesses and in contact therewith to thus form an uncured acrylic resin layer having prism-shaped protrusions, and then radiating UV light or applying heat to thus completely cure the uncured acrylic resin layer having the prism-shaped protrusions, thereby forming the first intermediate layer 130 (S240); applying a UV light-curable acrylic resin or a heat-curable acrylic resin in an uncured state to a predetermined thickness on the upper surface of the upper layer 150 (S250); passing the upper layer 150 having the uncured acrylic resin applied on the upper surface thereof over a roll having a plurality of hemispherical protrusions and in contact therewith to thus form an uncured acrylic resin layer having a plurality of hemispherical recesses, and then radiating UV light or applying heat to thus completely cure the uncured acrylic resin layer having the plurality of hemispherical recesses, thereby forming the upper diffuser layer 220 (S260); applying a UV light-curable acrylic resin or a heat-curable acrylic resin in an uncured state to a predetermined thickness on the lower surface of the upper layer 150 to thus form an uncured acrylic resin layer, and then bringing the lower layer 120 into close contact with the upper layer 150 so that the ridges of the prism-shaped protrusions of the first intermediate layer 130 come into contact with the uncured acrylic resin layer of the upper layer 150, under pressure the magnitude of which is set so that the ridges of the prism-shaped protrusions of the first intermediate layer 130 are not brought into direct contact with one surfne of the upper layer 150 but slightly overlap with the uncured acrylic resin layer of the upper layer 150, in a state in which the lower layer 120 is positioned on the upper layer 150 such that the uncured acrylic resin applied on the upper layer 150 does not flow down along the prism-shaped protrusions of the first intermediate layer 130 (S270); and radiating UV light or applying heat to thus completely cure the uncured acrylic resin layer of the lower surface of the upper layer 150, thereby forming the second intermediate layer 140 (S280).

Figure 17:
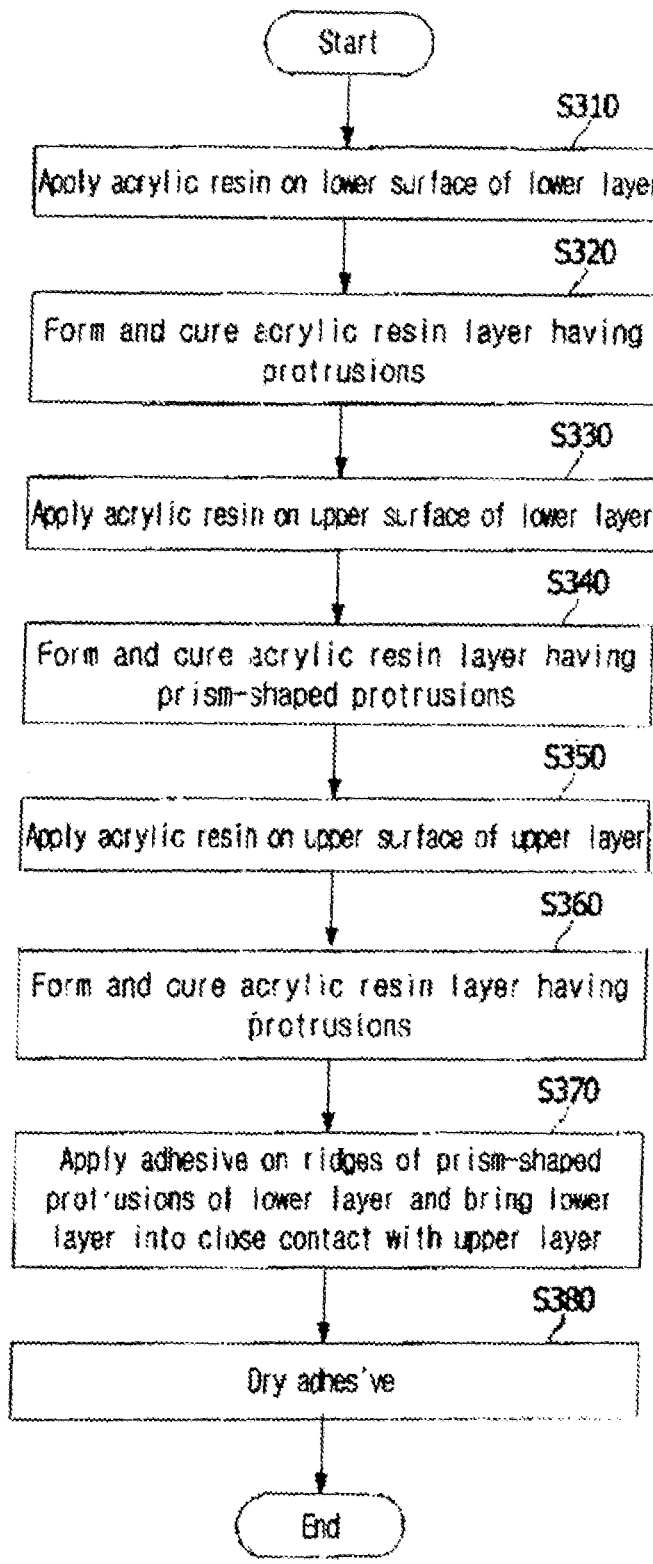
FIG. 17 is a flowchart illustrating a process of manufacturing the diffuser-integrated prism sheet according to the fifth embodiment of the present invention.

FIG. 17 is a flowchart illustrating a process of manufacturing the diffuser-integrated prism sheet according to the fifth embodiment of the present invention.

The method of manufacturing the diffuser-integrated prism sheet according to the fifth embodiment comprises applying a UV light-curable acrylic resin or a heat-curable acrylic resin in an uncured state to a predetermined thickness on the lower surface of the lower layer 120 (S310); passing the lower layer 120 having the uncured acrylic resin applied on the lower surface thereof over a roll having a plurality of hemispherical recesses and in contact therewith to thus form an uncured acrylic resin layer having a plurality of hemispherical protrusions, and then radiating UV light or applying heat to thus completely cure the uncured acrylic resin layer having the plurality of hemispherical protrusions, thereby forming the lower diffuser layer 110 (S320); applying a UV light-curable acrylic resin or a heat-curable acrylic resin in an uncured state to a predetermined thickness on the upper surface of the lower layer 120 (S330); passing the lower layer 120 having the uncured acrylic resin applied on the upper surface thereof over a roll having prism-shaped recesses and in contact therewith to thus form an uncured acrylic resin layer having prism-shaped protrusions, and then radiating UV light or applying heat to thus completely cure the uncured acrylic resin layer having the prism-shaped protrusions, thereby forming the intermediate layer 300 (S340); applying a UV light-curable acrylic resin or a heat-curable acrylic resin in an uncured state to a predetermined thickness on the upper surface of the upper layer 150 (S350); passing the upper layer 150 having the uncured acrylic resin applied on the upper surface thereof over a roll having a plurality of hemispherical recesses and in contact therewith to thus form an uncured acrylic resin layer having a plurality of hemispherical protrusions, and then radiating UV light or applying heat to thus completely cure the uncured acrylic resin layer having the plurality of hemispherical protrusions, thereby forming the upper diffuser layer 160 (S360); applying an adhesive 320 on the ridges 310 of the prism-shaped protrusions of the intermediate layer 300, and then bringing the lower layer 120 into close contact with the upper layer 150 such that the ridges of the prism-shaped protrusions thereof come into contact with the upper layer 150 (S370); and drying the adhesive 320 applied on the intermediate layer 300.

Figure 18:
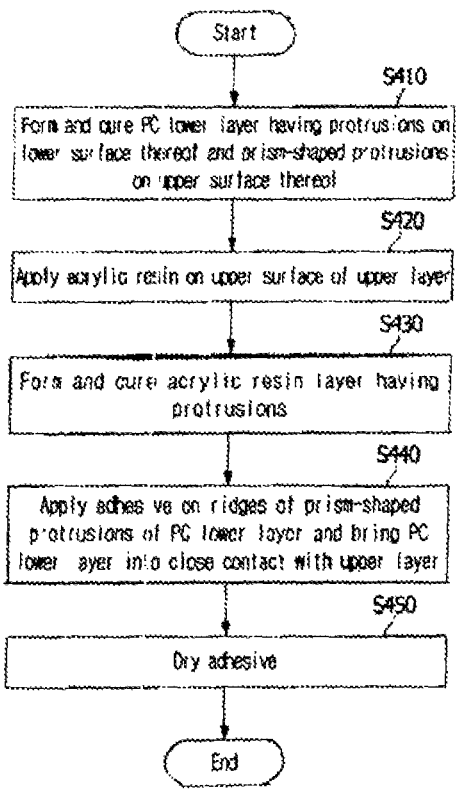
FIG. 18 is a flowchart illustrating a process of manufacturing the diffuser-integrated prism sheet according to the ninth embodiment of the present invention.

FIG. 18 is a flowchart illustrating a process of manufacturing the diffuser-integrated prism sheet according to the ninth embodiment of the present invention.

The method of manufacturing the diffuser-integrated prism sheet according to the ninth embodiment comprises passing a PC lower layer 400 formed of PC between an upper roll having prism-shaped recesses and a lower roll having a plurality of hemispherical recesses to thus form the PC lower layer 400 having prism-shaped protrusions on the upper surface thereof and a plurality of hemispherical protrusions on the lower surface thereof, and then radiating UV light or applying heat to thus cure the PC lower layer 400 (S410); applying a UV light-curable acrylic resin or a heat-curable acrylic resin in an uncured state to a predetermined thickness on the upper surface of the upper layer 150 (S420); passing the upper layer 150 having the uncured acrylic resin applied on the upper surface thereof over a roll having a plurality of hemispherical recesses and in contact therewith to thus form an uncured acrylic resin layer having a plurality of hemispherical protrusions, and then radiating UV light or applying heat to thus completely cure the uncured acrylic resin layer having the plurality of hemispherical protrusions, thereby forming the upper diffuser layer 160 (S430); applying an adhesive 420 on the ridges 410 of the prism-shaped protrusions of the PC lower layer 400, and then bringing the PC lower layer 400 into close contact with the upper layer 150 so that the ridges of the prism-shaped protrusions of the PC lower layer 400 come into contact with the upper layer 150 (S430); and drying the adhesive 420 applied on the PC lower layer 400.

Figure 19:
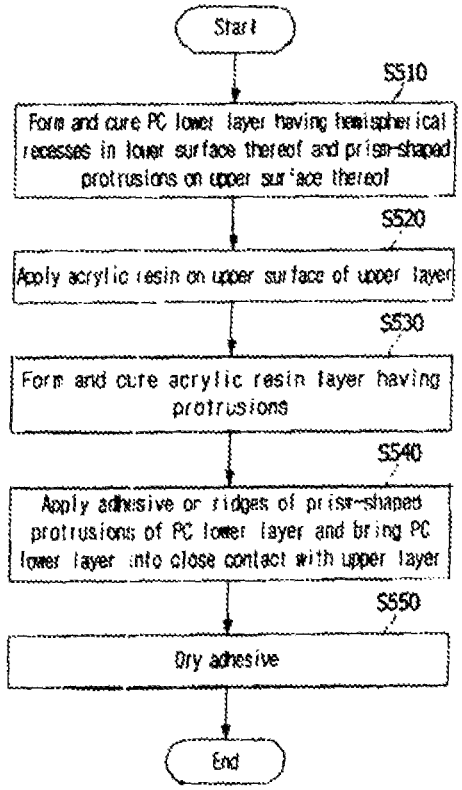
FIG. 19 is a flowchart illustrating a process of manufacturing the diffuser-integrated prism sheet according to the eleventh embodiment of the present invention.

FIG. 19 is a flowchart illustrating a process of manufacturing the diffuser-integrated prism sheet according to the eleventh embodiment of the present invention.

The method of manufacturing the diffuser-integrated prism sheet according to the eleventh embodiment comprises passing a PC lower layer 500 formed of PC between an upper roll having prism-shaped recesses and a lower roll having a plurality of hemispherical protrusions to thus form the PC lower layer 500 having prism-shaped protrusions on the upper surface thereof and a plurality of hemispherical recesses in the lower surface thereof, and then radiating UV light or applying heat to thus cure the PC lower layer 500 (S510); applying a UV light-curable acrylic resin or a heat-curable acrylic resin in an uncured state to a predetermined thickness on the upper surface of the upper layer 150 (S520); passing the upper layer 150 having the uncured acrylic resin applied on the upper surface thereof over a roll having a plurality of hemispherical recesses and in contact therewith to thus form an uncured acrylic resin layer having a plurality of hemispherical protrusions, and then radiating UV light or applying heat to thus completely cure the uncured acrylic resin layer having the plurality of hemispherical protrusions, thereby forming the upper diffuser layer 160 (S530); applying an adhesive 520 on the ridges 510 of the prism-shaped protrusions of the PC lower layer 500, and then bringing the PC lower layer 500 into close contact with the upper layer 150 so that the ridges of the prism-shaped protrusions of the PC lower layer 500 come into contact with the upper layer 150 (S530); and drying the adhesive 520 applied on the PC lower layer 500.

As described hereinbefore, the present invention provides a diffuser-integrated prism sheet for backlight units and a method of manufacturing the same. According to the present invention, because the prism sheet includes prism-shaped protrusions formed therein and diffuser layers integrated therewith, the defect rates attributable to scratching and the entry of impurities in the course of assembling a backlight unit can be drastically decreased. Further, the generation of shatter cracks by friction with other sheets can be decreased, thus improving workability, and accordingly, defect rates can be greatly decreased, resulting in improved productivity. Moreover, various optical sheets are integratedly layered, thus realizing a short assembly time and a simple assembly process, resulting in decreased costs.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A method of manufacturing a diffuser-integrated prism sheet, comprising:
   applying a first uncured resin to a predetermined thickness on a lower surface of a first resin sheet;
   passing the first resin sheet having the first uncured resin over a roll having a plurality of hemispherical recesses and in contact therewith to thus form a first uncured resin layer having a plurality of hemispherical protrusions, and then radiating UV light to thus cure the first uncured resin layer, thereby forming a lower diffuser layer;
   applying a second uncured resin on an upper surface of the first resin sheet;
   passing the first resin sheet having the second uncured resin over a roll having prism-shaped recesses and in contact therewith to thus form a second uncured resin layer having prism-shaped protrusions, and then radiating UV light to thus cure the second uncured resin layer;
   applying a third uncured resin to a predetermined thickness on an upper surface of a second resin sheet;
   passing the second resin sheet having the third uncured resin over a roll having a plurality of hemispherical recesses and in contact therewith to thus form a third uncured resin layer having a plurality of hemispherical protrusions, and then radiating UV light to thus cure the third uncured resin layer, thereby forming an upper diffuser layer;
   applying an adhesive on ridges of the prism-shaped protrusions of the first resin sheet, and then bringing the first resin sheet into close contact with the second resin sheet so that the ridges of the prism-shaped protrusions of the first resin sheet come into contact with one surface of the second resin sheet; and
   drying the adhesive.

2. The method according to claim 1, wherein the first resin sheet and the second resin sheet are a polyethylene terephthalate (PET) sheet, and the first uncured resin, the second uncured resin, and the third uncured resin are a UV light-curable acrylic resin.

3. The method according to claim 1, wherein the adhesive is any one selected from among highly transparent adhesives, including silicone-urethane hybrid polymers, acrylic polymers, and polyester-based polymers.

4. The method according to claim 1, wherein a cross-section of each of the prism-shaped protrusions has a triangular shape, a pentagonal shape, or a heptagonal shape.

* * * * *